United States Patent
Negi et al.

(10) Patent No.: US 10,726,120 B2
(45) Date of Patent: Jul. 28, 2020

(54) SYSTEM, APPARATUS AND METHOD FOR PROVIDING LOCALITY ASSERTION BETWEEN A SECURITY PROCESSOR AND AN ENCLAVE

(71) Applicant: Intel Corporation, Santa Clara, CA (US)

(72) Inventors: Ansuya Negi, Hillsboro, OR (US); Ravi L. Sahita, Portland, OR (US)

(73) Assignee: Intel Corporation, Santa Clara, CA (US)

(*) Notice: Subject to any disclaimer, the term of this patent is extended or adjusted under 35 U.S.C. 154(b) by 463 days.

(21) Appl. No.: 15/475,239

(22) Filed: Mar. 31, 2017

(65) Prior Publication Data
US 2018/0285560 A1   Oct. 4, 2018

(51) Int. Cl.
*G06F 21/53* (2013.01)
*G06F 21/72* (2013.01)

(52) U.S. Cl.
CPC .............. *G06F 21/53* (2013.01); *G06F 21/72* (2013.01)

(58) Field of Classification Search
USPC .......................................................... 726/22
See application file for complete search history.

(56) References Cited

U.S. PATENT DOCUMENTS

| | | | |
|---|---|---|---|
| 2016/0182531 A1* | 6/2016 | Rubakha | H04L 63/123 726/1 |
| 2016/0285875 A1* | 9/2016 | Lenz | H04L 63/10 |
| 2018/0069836 A1* | 3/2018 | Mandyam | H04L 63/0853 |
| 2018/0212971 A1* | 7/2018 | Costa | H04L 63/101 |

OTHER PUBLICATIONS

Intel Corporation, "Intel® Software Guard Extensions," 2016, 34 pages.

* cited by examiner

*Primary Examiner* — Kambiz Zand
*Assistant Examiner* — Aubrey H Wyszynski
(74) *Attorney, Agent, or Firm* — Trop, Pruner & Hu, P.C.

(57) ABSTRACT

In one embodiment, a system includes a processor having one or more cores and a security processor coupled to the processor. The security processor may be configured to execute in a trusted execution environment, where the security processor includes a local attestation circuit to validate an enclave stored in a protected region of a system memory as a trusted agent, based at least in part on an identifier of the enclave stored in a whitelist. Other embodiments are described and claimed.

18 Claims, 7 Drawing Sheets

SYSTEM, APPARATUS AND METHOD FOR PROVIDING LOCALITY ASSERTION BETWEEN A SECURITY PROCESSOR AND AN ENCLAVE

TECHNICAL FIELD

Embodiments relate to providing attestation services.

BACKGROUND

In many current computing systems, protected software such as container-based software is open to threat surfaces where entities in communication are not known or verified. In order to provide trust assertions as to software, some kind of attestation is performed. Often this attestation for software that executes on a given computing system involves interaction with one or more remote systems such as a cloud-based service. This external attestation increases the threat surface to the protected software.

DETAILED DESCRIPTION

In various embodiments, a computing system including a security processor and one or more enclave-based secure software instantiations may provide an instruction-based approach to bind the security processor to the one or more enclaves so that the security processor can provide attestation services to the enclaves locally. In many cases, these enclaves may be third party enclaves, namely of one or more independent software vendors (ISVs). By providing this local attestation with a trusted hardware processor attesting to the trustworthiness of locally instantiated software, a threat surface to this trusted software is reduced. As used herein, the term "enclave" is used to refer to a monolithic software entity that reduces a Trusted Computing Base (TCB) for an application to a trusted runtime system, ISV code and, possibly, third party trusted libraries. As an example, the enclave may be any type of trusted execution environment (TEE) on a platform that has platform roots.

When an entity seeks to communicate to an enclave, it has no mechanism to determine itself that an enclave is involved. This is especially true in the case of a third party enclave loaded into a system that seeks to prove that its code is running in an enclave. In embodiments, a local TEE such as implemented using a security processor can perform this attestation for a requesting entity.

In an embodiment, a user-level instruction of an instruction set architecture (ISA) may be provided to be executed by a combination of a security processor and a general-purpose processor (such as a central processing unit (CPU)) of a given system. This instruction may be used to provide the locality binding. After a valid local binding, instead of a remote attestation server providing verification for a given enclave, an attestation logic of a security processor can perform local attestation. Note that embodiments may be extended to all system devices protected by the security processor, such as a trusted time circuit and a monotonic counter. Note that an enclave can have access to other usages apart from attestation such as cryptographic usages. An enclave to a given security processor channel may seamlessly export a variety of services to other ISV enclaves. If the enclave seeks any information from these devices protected by the security processor, it can also be sure that the security processor is on the same platform.

Note that a properly instantiated enclave has a root of trust in the CPU. The security processor itself is bound to this root of trust at the CPU to enable a validation that both enclave and the security processor are resident in the same single computing device.

At a high level, at a first stage of this local binding, a system is provided with a whitelist of approved, trusted enclaves (which may be periodically updated). This whitelist may be received in the system from a remote attestation or authentication server. In turn, this whitelist may be stored in a trusted storage of the security processor. When a given, e.g., third party, enclave seeks to be attested, it may send a quote to the security processor to enable the security processor to verify that an identification of the enclave is included in the whitelist.

At a second stage, enclave memory accessible to the security processor may be remapped using hardware-based mechanisms. This remapping may include the CPU, executing in its TCB, setting up virtualization technology page tables that the security processor, acting as a direct memory access (DMA) bus master, is subject to when it performs accesses to this region. Since this region is protected by hardware, it is not accessible to other entities.

At a third stage, in response to writing of the security processor reporting instruction by the security processor, the CPU may operate to bind the security processor to the enclave. Note that any given third party enclave includes a memory portion (e.g., a few pages) in memory that is only accessible to the security processor. Once a third party enclave is instantiated, the CPU can determine that an enclave mode is active (which may be identified by enabling an "in enclave mode" indicator in one or more control registers). In an embodiment, the "in enclave mode" indicator is stored in an access-controlled register that can only be set by the CPU when a correctly initialized enclave is executing on a logical processor. When the security processor updates the protected memory region via this security processor reporting instruction, the CPU can determine that the security processor mode is active (which may be identified by enabling an "in security processor mode" indicator in one or more control registers). In an embodiment the CPU may initiate special bus cycles in the context of the reporting instruction to signal to the security processor that the CPU is executing in a validated enclave when it issued the command to the security processor. These special cycles may be signals carried on the bus (for example a host embedded controller interface (HECI) bus) used to communicate with the security processor. In other embodiments, these cycles can be conveyed by cryptographic means of a shared secret between the CPU and the security processor.

This is the case, as the CPU knows that only the security processor can write in this special memory region. As such, the CPU, being aware of both modes, enables a local binding to occur between the security processor and the enclave. As such, embodiments enable local attestations to occur without interaction with any external entities. Embodiments thus provide architectural mechanisms to provide local attestation to any third party enclave.

Figure 1:
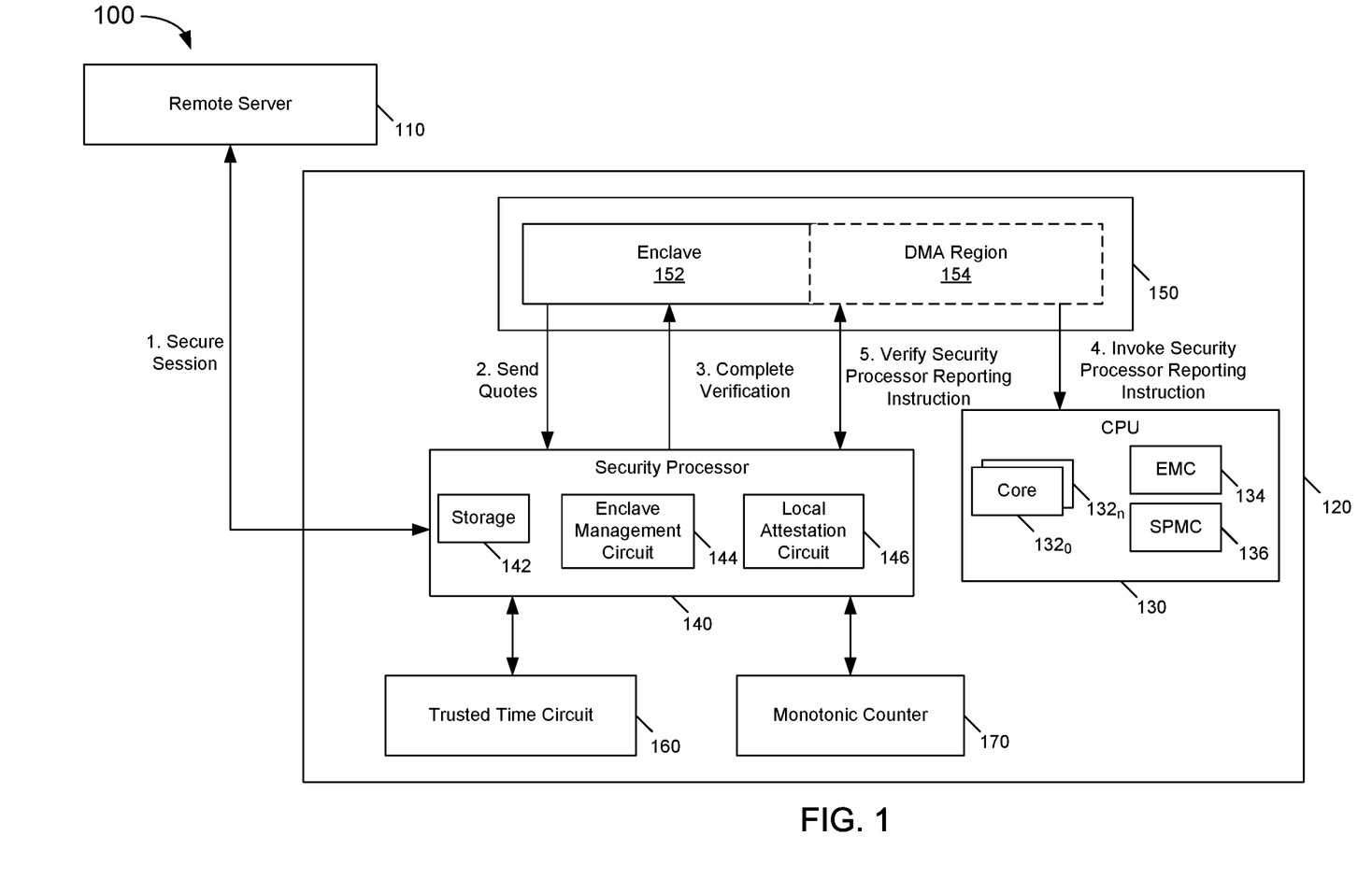
FIG. 1 is a block diagram of a system environment in accordance with an embodiment of the present invention.

Referring now to FIG. 1, shown is a block diagram of a system environment in accordance with an embodiment of the present invention. As shown in FIG. 1, system environment 100 includes a remote server 110. Remote server 110 may be a trusted server associated with a trusted processor manufacturer. More specifically, remote server 110 is configured to perform secure remote attestations for security processors present in remote systems such as a client system 120. In one embodiment, remote server 110 may be a datacenter-based authentication server to provide attestation services for hardware security processors such as implemented in various client systems, as well as to provide attestation services for software-based secure environments, also referred to herein as enclaves.

In different implementations, client system 120 may be any type of computing device, ranging from smartphone, tablet computer, laptop computer, desktop computer or so forth. While remote server 110 can perform remote attestations to enable attestations and bindings between a security processor within client system 120 and one or more enclaves also present within client system 120, remote server 110 also may be configured to provide one or more whitelists to client system 120. Such whitelists may include a list of ISVs and/or other software vendors having approved trusted or enclave-based applications.

With reference to client system 120, a CPU 130 is present. In different embodiments, CPU 130 may be any type of processor such as, e.g., a multicore processor. In the embodiment shown, CPU 130 includes a plurality of cores $132_0$-$132_n$. In different embodiments, these cores may be homogeneous cores, or there may be sets of heterogeneous cores, such as a mix of lower power and higher power processing cores, in-order cores, out-of-order cores or so forth. As illustrated in FIG. 1, CPU 130 also includes an enclave management circuit 134, which may be implemented as a dedicated hardware circuit or programmable hardware circuitry, that is configured to perform at least some management activities on behalf of one or more enclaves that execute within client system 120. CPU 130 further includes a security processor management circuit 136, which may be implemented as a dedicated hardware circuit or programmable hardware circuitry, that may act as a management interface with respect to a security processor 140 of client system 120.

In various embodiments, security processor 140 may be a separate integrated circuit from CPU 130 that is configured to execute in a trusted execution environment in which trust activities occur in a manner that is not visible to an operating system (OS) that executes on CPU 130. As one example, security processor 140 may be implemented as an Intel® Converged Security and Manageability Engine (CSME) device. However, understand the scope of the present invention is not limited to this aspect and in other cases, security processor 140 and CPU 130 may be implemented within a single integrated circuit. In such cases, understand that security processor 140 still may be transparent to an OS executing on CPU 130.

As will be described herein, security processor 140 may include or be associated with a trusted storage 142. Such trusted storage 142 may be configured to store one or more whitelists as received from remote server 110. As further illustrated in FIG. 1, security processor 140 further includes an enclave management circuit 144. In various embodiments, enclave management circuit 144, which may be implemented as a dedicated hardware circuit or programmable hardware circuitry, can perform management activities on behalf of one or more enclaves that are instantiated within system 120. Such management activities may include instantiation of the enclave, as well as providing trust services for the instantiated enclave, control activities and termination activities.

As further illustrated in FIG. 1, security processor 140 further includes a local attestation circuit 146. As will be described herein, local attestation circuit 146, which may be implemented as a dedicated hardware circuit or programmable hardware circuitry, can perform a local attestation for validly instantiated enclaves within client system 120. In an embodiment, such attestation may provide a demonstration that this instantiated enclave was validly instantiated in a correct manner. In this way, the need for interacting with one or more remote systems such as remote server 110 for performing such attestations can be avoided, reducing latency for attestation processes, as well as potential attack mechanisms.

Still with reference to FIG. 1, client system 120 further includes a memory 150 which in an embodiment may be implemented as a dynamic random access memory (DRAM). As seen, an enclave 152 is implemented as a trusted partition or region of memory 150. In an embodiment, enclave 152 may be an Intel® Software Guard Extensions (SGX) enclave. Enclave 152 further includes a special memory region 154, which in an embodiment may be a direct memory access (DMA) region accessible only to security processor 140. Client system 120 further may include protected hardware resources accessible to security processor 140. In the embodiment shown in FIG. 1, such components include a trusted time circuit 160 and a monotonic counter 170.

As further shown in FIG. 1, the ability to provide for local attestation can be realized first by obtaining one or more whitelists from remote server 110. In an embodiment, such whitelist may be communicated during a secure session between client system 120 and remote server 110. In a particular embodiment, such secure session may be a Sigma (SIGn and MAc) key-exchange protocol communication session.

Next, upon initialization of secure enclave 152, a quote is sent to security processor 140 to enable security processor 140 to verify the existence and trust capabilities of enclave 152. In an embodiment, an enclave may include a self-signed certificate or signature from an ISV that includes information to determine whether there has been any malicious activity with regard to the enclave. In an embodiment, this enclave signature may include a measurement, such as a hash value that identifies the code of the enclave and any initial data. In some cases, during instantiation of the enclave, CPU 130 may calculate the enclave measurement and compare the calculated value with the stored value in the enclave signature. In embodiments, the enclave signature may further include public key information of the ISV, which in an embodiment may be a hash of a public key stored in an MRSIGNER register. Additional information may be stored in the signature such as version numbers and so forth.

Note that the quote may include a credential or report of the valid existence of enclave 152 on system 120 having valid hardware protection mechanisms. At completion of this verification of this quote, security processor 140 may issue a security processor reporting instruction to CPU 130 by writing this instruction within DMA region 154. In an embodiment, the security processor reporting instruction may be implemented as an instruction of a given ISA, referred to herein as an EREPORTME instruction. In turn when CPU 130 identifies the writing of this instruction, CPU 130 may perform a locality binding between enclave 152 and security processor 140, as it has thus verified that both of these entities are resident on the same system and co-resident with CPU 130. In this way, a local attestation can occur without the need for communication with remote server 110 or any other remote entity, improving efficiency of such attestation as well as its greater security by way of protection from hostile attack from outside of client system 120. After such attestation, enclave 152 may leverage security processor 140 to access trusted resources such as trusted time circuit 160 and monotonic counter 170. Understand while shown at this high level in the embodiment of FIG. 1, many variations and alternatives are possible.

Figure 2:
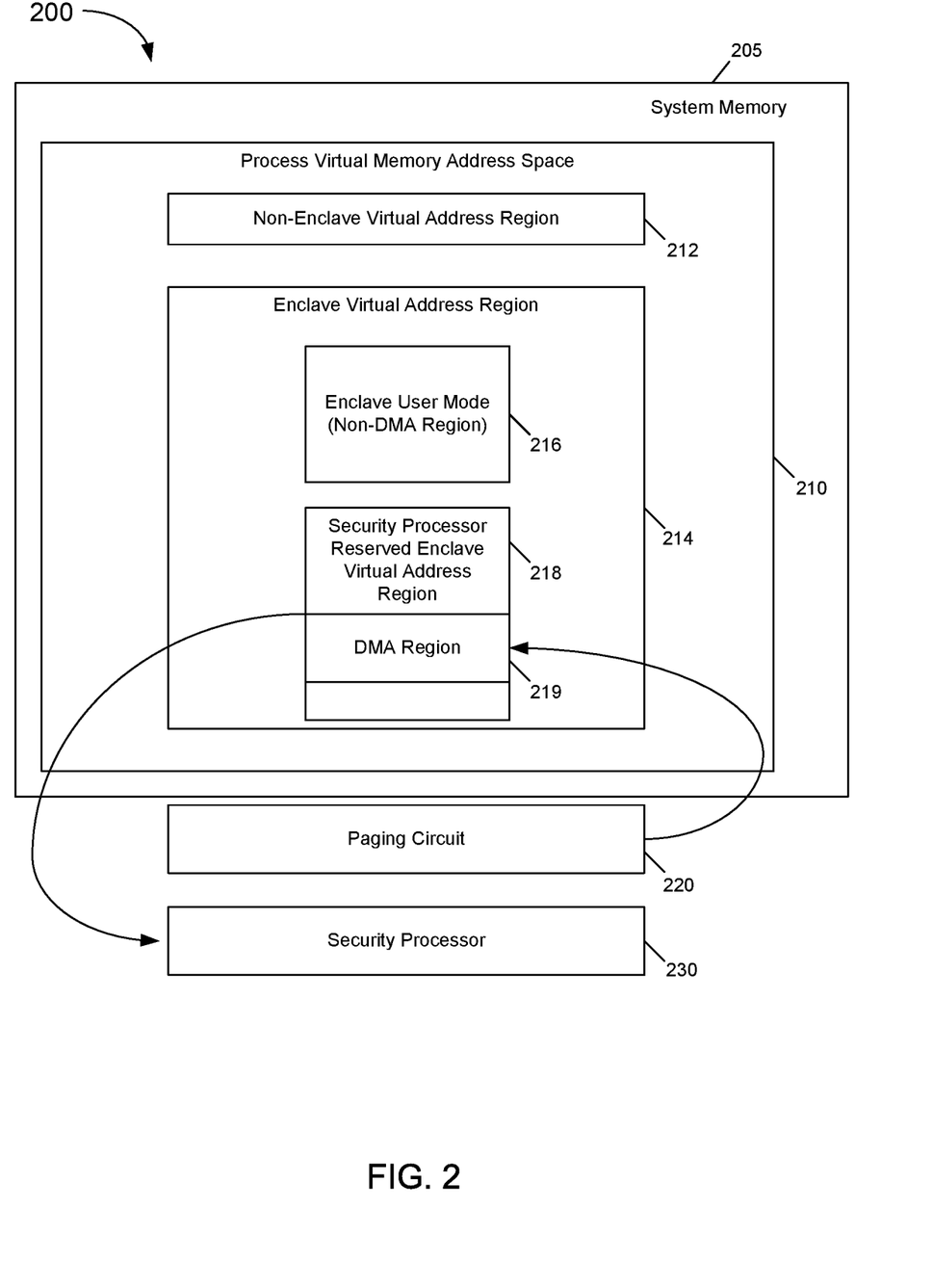
FIG. 2 is an illustration of a creation of an enclave virtual address region in accordance with an embodiment of the present invention.

Referring now to FIG. 2, shown is an illustration of a creation of an enclave virtual address region in accordance with an embodiment of the present invention. As shown in FIG. 2, a system 200 includes a system memory 205, such as a dynamic random access memory (DRAM). Within memory 205, a process virtual memory address space 210 is provided. In turn, virtual memory address space 210 includes a non-enclave virtual address region 212 that is an unprotected memory region accessible to all entities within system 200. In turn, an enclave virtual address region 214 also is present. Enclave virtual address region 214 is a protected memory region accessible only to a given enclave and a security processor 230. Note in turn that this enclave virtual address region includes an enclave user mode region 216 that is to be accessed by an enclave as a non-DMA region of memory.

In addition, an enclave virtual address region 218 is reserved for security processor 230. Within region 218 a DMA region 219 is present. In embodiments herein, DMA region 219 may only be accessible to security processor 230. That is, DMA region 219 is not otherwise accessible to a given enclave. To provide hardware-based protection for DMA region 219, a hardware paging circuit 220 is present. In embodiments, paging circuit 220 may use paging mechanisms of a memory management unit such as a virtualized memory management unit to protect access to DMA region 219 so that only security processor 230 can access this memory region. In embodiments, paging circuit 220 may re-map DMA region 219 such that it is only accessible to security processor 230 via, e.g., a hardware-protected region that is not accessible to other entities. Understand while shown at this high level in the embodiment of the FIG. 2, many variations and alternatives are possible.

Figure 3:
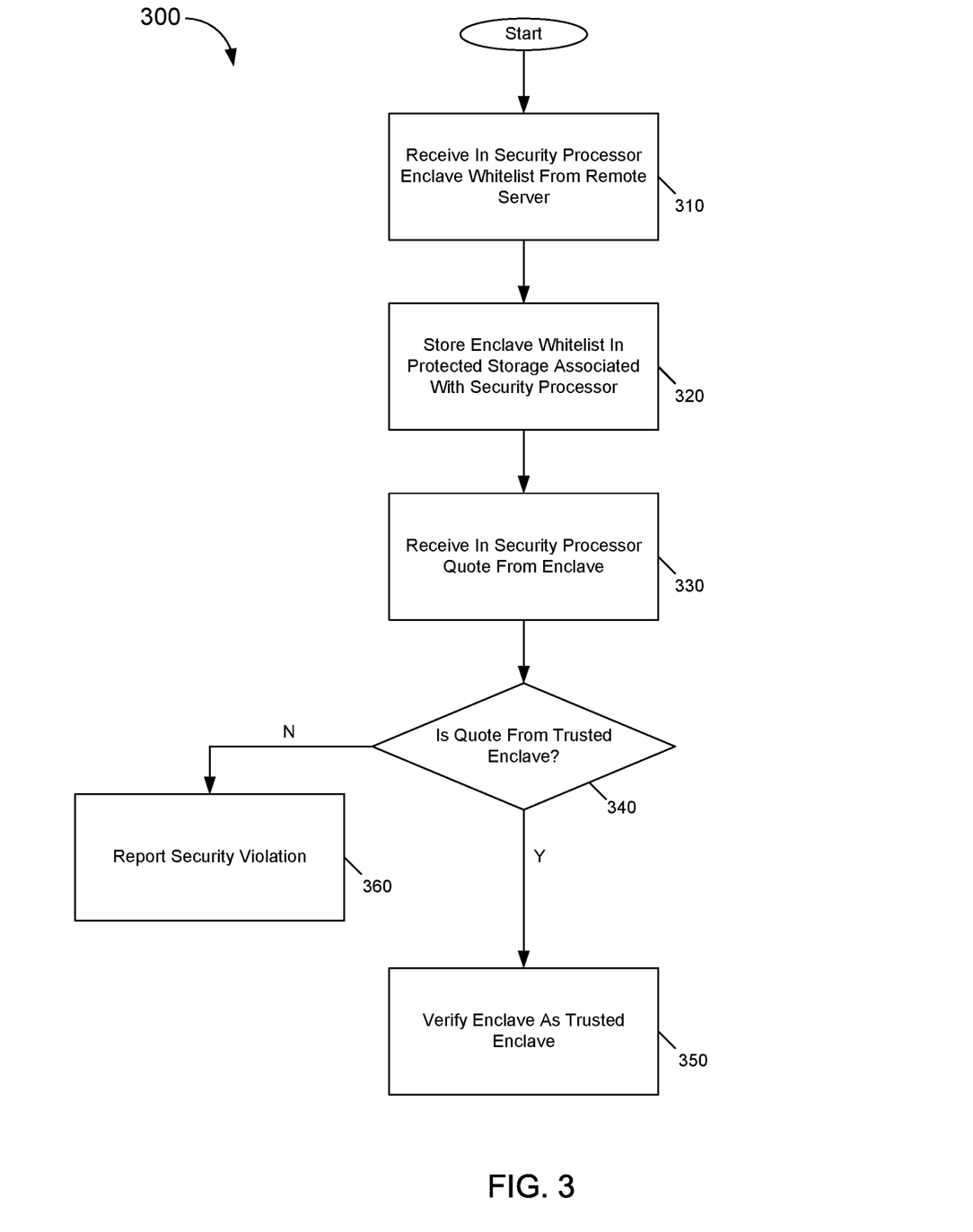
FIG. 3 is a flow diagram of a method in accordance with an embodiment of the present invention.

As discussed above, embodiments enable local attestation and binding between an enclave and a local security processor by first receiving a whitelist of enclaves, remapping an enclave memory to include a region accessible only to the security processor, and finally locally binding the security processor to the enclave. Referring now to FIG. 3, shown is a flow diagram of a method in accordance with an embodiment of the present invention. Method 300 shown in FIG. 3 may be performed by hardware circuitry, software, firmware and/or combinations thereof of a system. More particularly, method 300 is used to obtain an updated whitelist from a remote server to be useable to identify whether a given enclave is represented within this whitelist. As seen in FIG. 3, method 300 begins by receiving an enclave whitelist from a remote server (block 310). In an embodiment, the security processor may receive this enclave list during a Sigma session with the remote server. Thereafter, the security processor may store this enclave whitelist in a protected storage. This protected storage may, in an embodiment, be an internal memory of the security processor, or it can be another local storage of the system that is associated with and accessible only to the security processor.

Control next passes to block 330 where the security processor may receive a quote from an enclave that is instantiated within the system. In an embodiment, this quote may include a hash value corresponding to a hash of a public key of the enclave. In one particular embodiment, a quote is a report of an enclave that is signed by a private key of the platform and the signature is encrypted with the public key of an authentication server. In an embodiment, the enclave may calculate a hash value of an image of the enclave after its instantiation. At diamond 340 it is determined whether this quote is from a trusted enclave. In one embodiment, this determination may be based on a comparison of the received hash value from the quote with corresponding hash values present in the whitelist. If it is determined that a match exists in that the received hash value matches a hash value stored in the whitelist, control passes to block 350 where the enclave is verified as a trusted enclave, as it is thus identified as an enclave present on a whitelist received during a secure session with a remote server.

Otherwise if it is determined that the quote is not from a trusted enclave, control passes to block 360 where a security violation may be reported. In some embodiments, in this case the enclave, to the extent that it has been instantiated and initialized, may be discarded from memory. Understand while shown at this high level in the embodiment of FIG. 3, many variations and alternatives are possible.

Figure 4:
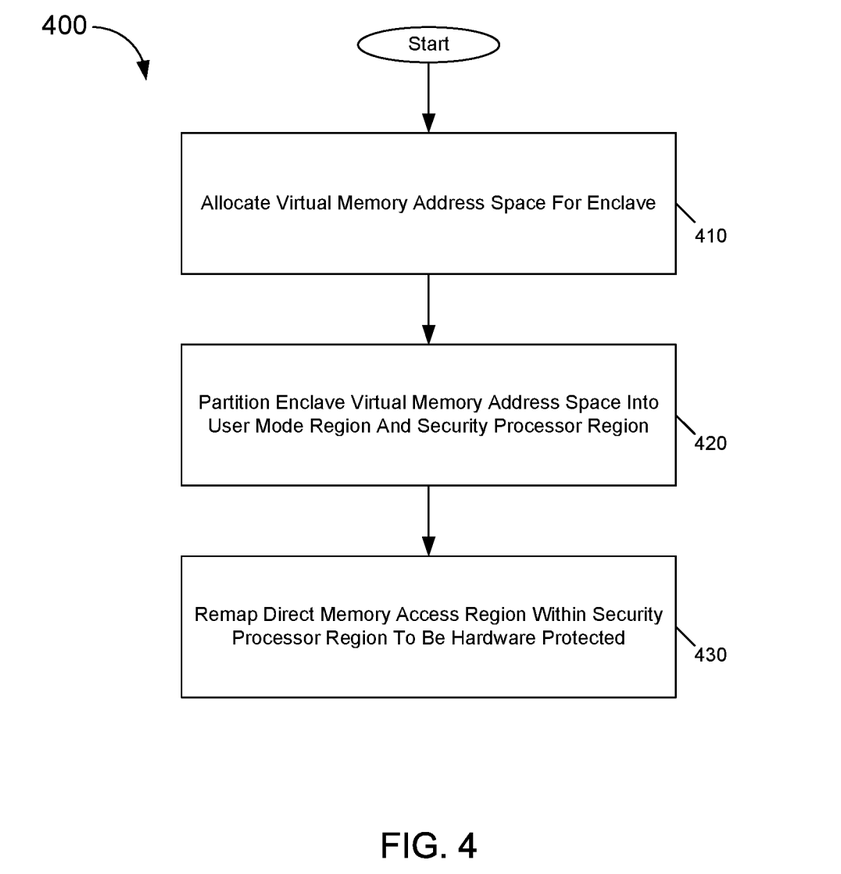
FIG. 4 is a flow diagram of a method in accordance with another embodiment of the present invention.

Referring now to FIG. 4, shown is a flow diagram of a method in accordance with another embodiment of the present invention. More specifically, method 400 of FIG. 4 is a method for remapping a portion of an enclave memory to be accessible only to a security processor. In an embodiment, method 400 may be performed by hardware circuitry, software, firmware and/or combinations thereof. As an example, hardware paging circuitry of a processor can be used to execute method 400.

As seen, method 400 begins by allocating a virtual memory address space for an enclave (block 410). This allocation may be performed by way of updating page table mechanisms, e.g., of a virtual memory management unit (MMU) to identify an address space for this enclave. Thereafter at block 420 the enclave virtual memory address space may be partitioned into different regions, including a user mode region and a security processor region. Understand that the user mode region may be accessible to the enclave itself as well as the security processor and the host CPU. At block 430, a direct memory access region within this security processor region may be remapped such that it is hardware protected. Understand while shown at this high level in the embodiment of FIG. 4, many variations and alternatives are possible.

Figure 5:
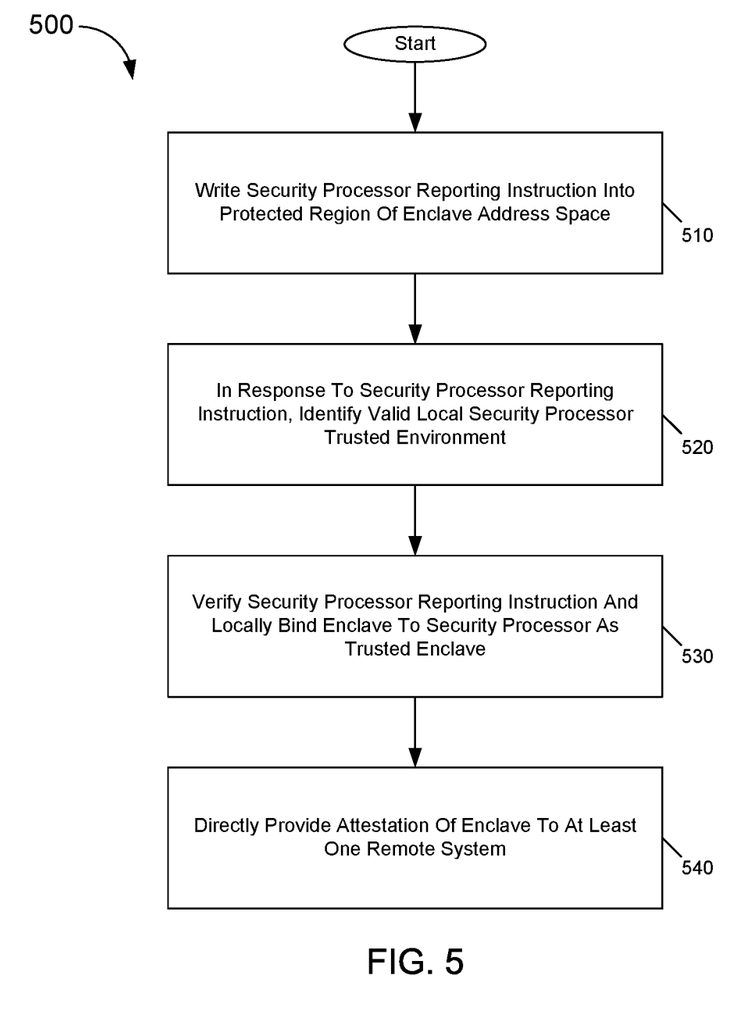
FIG. 5 is a flow diagram of a method in accordance with yet another embodiment of the present invention.

Referring now to FIG. 5, shown is a flow diagram of a method in accordance with yet another embodiment of the present invention. As shown in FIG. 5, method 500 may be performed to enable a local binding between an enclave and a security processor. Method 500 may be executed at least in part using a CPU of the computing system, along with the security processor. As illustrated, method 500 begins by writing a security processor reporting instruction into a protected region of the enclave address space (block 510). In an embodiment, the security processor may write via the EREPORTME instruction into the enclave memory address region. Note however that it is not written into the general memory region, as this is not accessible to the CPU. The security processor is granted the ability to DMA the reporting structure into specific enclave memory pages. These pages are added to the enclave during initialization. In one embodiment, this security processor reporting instruction, EREPORTME, may take the form of: <opcode> <parameters: pointer to enclave reporting structure; pointer (address) of DMA'able page in enclave linear address space; and challenge nonce>. In an embodiment, execution of the EREPORTME instruction deposits a payload with these parameters into the security processor firmware memory queue along with the special cycle/signals asserted (as described above). The firmware memory queue is accessible only to the platform security processor.

Control next passes to block 520 where in response to this instruction, a valid local security processor trusted environment is identified. That is, as the CPU reads this instruction in an enclave region of a system that also locally includes the security processor that wrote the instruction, it is guaranteed that both of these entities, namely the security processor and the enclave, are present on the same machine. As such, a local binding can occur. Thus as illustrated in FIG. 5, control passes to block 530 where this security processor reporting instruction is verified and the enclave is locally bound to the security processor as a trusted enclave. As such, the enclave may access trusted resources of the system via the security processor. Also understand at this point, the security processor may directly provide attestation services on behalf of the enclave. More specifically at block 540 in response to a request for attestation, e.g., from an entity of a remote computing system, the security processor may directly provide attestation of the enclave. Understand while shown at this high level in the embodiment of FIG. 5, many variations and alternatives are possible.

Figure 6:
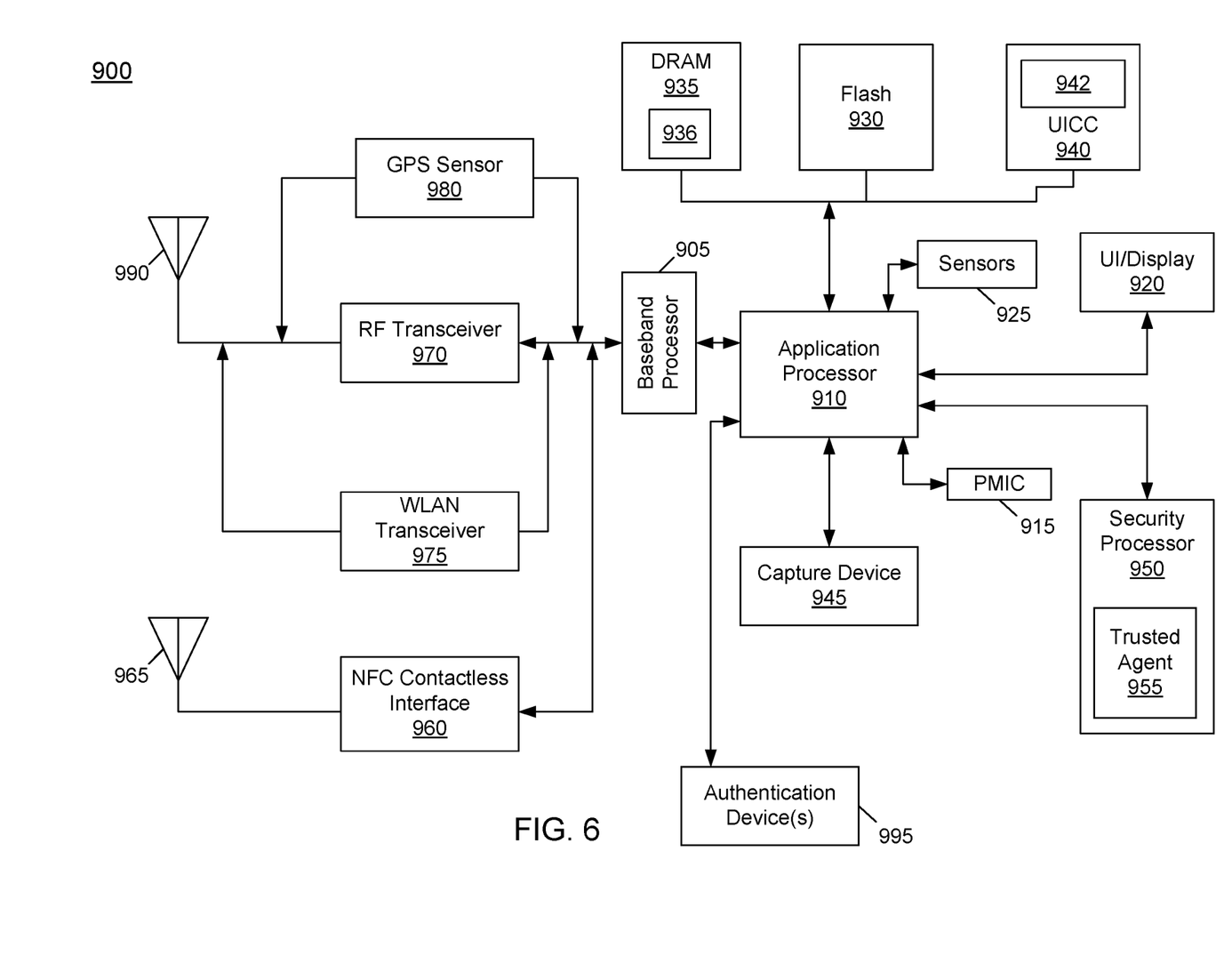
FIG. 6 is a block diagram of an example system with which embodiments can be used.

Referring now to FIG. 6, shown is a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In different embodiments, application processor 910 may include circuitry to enable a local binding to occur, as described herein. In some embodiments, DRAM 935 may include a secure portion 936 in which secrets and other sensitive information including an enclave whitelist may be stored. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 that may implement a TEE, and which may couple to application processor 910. In one embodiment, security processor 950 may include a trusted agent 955 configured to enable enclave operations and locally bind with such enclaves, so that local attestations may be performed, as described herein.

Furthermore, application processor 910 may implement a secure mode of operation, such as Intel® SGX for hosting of a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more wireless networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
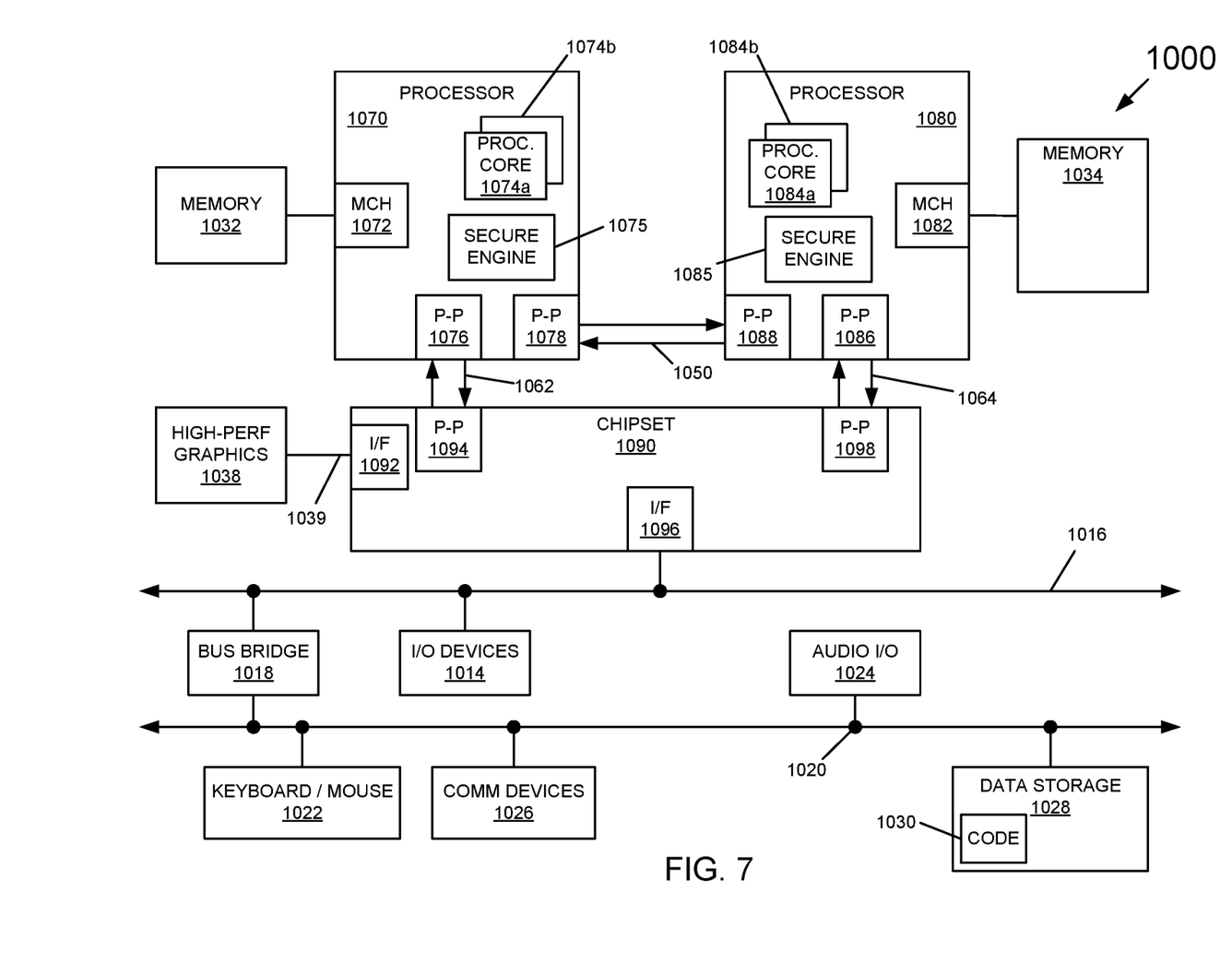
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations including the local binding with an enclave and local attestations on behalf of such enclave, as described herein.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. As illustrated, memories 1032, 1034 each include one or more execute-only regions 1033, 1035 to be provisioned for use in secure communication between applications. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

The following Examples pertain to further embodiments.

In Example 1, a system includes: a processor including one or more cores; and a security processor coupled to the processor, the security processor to execute in a trusted execution environment, where the security processor comprises a local attestation circuit to validate an enclave stored in a protected region of a system memory as a trusted agent, based at least in part on an identifier of the enclave stored in a whitelist.

In Example 2, the security processor is to receive the whitelist from a remote server during a secure session with the remote server, the remote server an authentication server of a manufacturer of the security processor.

In Example 3, the whitelist comprises a plurality of entries, each entry to identify an enclave and to store a hash value of the enclave.

In Example 4, the security processor is to validate the enclave based at least in part on a comparison of a computed hash and a hash value stored in a corresponding entry of the whitelist, the computed hash value received in a digest from the enclave.

In Example 5, the protected region comprises: an enclave user mode region accessible to the processor; and a virtual address memory region accessible to the security processor.

In Example 6, the virtual address memory region comprises a DMA region, where the security processor is to write a security processor reporting instruction to the DMA region.

In Example 7, the processor comprises an enclave mode circuit to interact with the enclave in an enclave mode.

In Example 8, the processor comprises a security processor mode circuit to interact with the security processor in a security processor mode.

In Example 9, the processor is to locally bind the enclave to the security processor.

In Example 10, after the local binding of the enclave to the security processor, the security processor is to attest to a trusted state of the enclave to at least one remote requester.

In Example 11, the system further comprises at least one of: a trusted time circuit, where the security processor is to enable the enclave to access the trusted time circuit after the enclave is validated as the trusted agent; and a monotonic counter, where the security processor is to enable the enclave to access the monotonic counter after the enclave is validated as the trusted agent.

In Example 12, a method comprises: receiving, in a CPU of a computing system, an indication that a security processor of the computing system has written a reporting instruction to a protected region of an enclave address space of a system memory of the computing system; identifying that the security processor is in execution in a trusted execution environment; and in response to identifying that the security processor is in the execution in the trusted execution environment and that an enclave associated with the enclave address space is validly instantiated, locally binding the enclave and the security processor.

In Example 13, the method further comprises, in response to instantiation of the enclave, setting a first mode indicator to indicate that the enclave is validly instantiated in the trusted execution environment.

In Example 14, the method further comprises, in response to identifying that the security processor is in the execution in the trusted execution environment, setting a second mode indicator to indicate that the security processor is in valid execution in the trusted execution environment.

In Example 15, the method further comprises locally binding the enclave and the security processor in response to the set first mode indicator and the set second mode indicator, and thereafter attesting, by the security processor, to a state of the enclave to at least one remote requester.

In Example 16, the method further comprises generating a quote of the enclave after the enclave is instantiated.

In Example 17, the method further comprises sending the quote to the security processor, to enable the security processor to compare a hash value of the quote to a stored hash value, the stored hash value present in a whitelist stored in a trusted storage of the security processor that identifies trusted enclaves, the whitelist received from a remote authentication server associated with a manufacturer of the security processor.

In Example 18, a computer readable medium including instructions is to perform the method of any of the above Examples.

In Example 19, a computer readable medium including data is to be used by at least one machine to fabricate at least one integrated circuit to perform the method of any one of the above Examples.

In Example 20, an apparatus comprises means for performing the method of any one of the above Examples.

In Example 21, an apparatus includes a processor including one or more cores, at least one of the one or more cores including an enclave management circuit to manage an enclave, the enclave stored in an enclave virtual address region of a system memory and a security processor management circuit to manage interaction with a security processor. The apparatus may further include the security processor coupled to the processor, where the security processor comprises a local attestation circuit to validate the enclave in response to a comparison between a computed hash value of the enclave and a stored hash value, the stored hash value stored in a whitelist. The apparatus also may include the system memory coupled to the processor and including the enclave virtual address region to store the enclave, where the processor is to locally bind the enclave and the security processor.

In Example 22, the security processor is to receive the whitelist from a remote server during a secure session with the remote server, the remote server an authentication server of a manufacturer of the security processor, where the whitelist comprises a plurality of entries, each entry to store a stored hash value of an enclave.

In Example 23, the local attestation circuit is, in response to validation of the enclave, to directly send an attestation report to a remote requester to provide an attestation of a security state of the enclave, without interaction with a remote authentication server.

In Example 24, an apparatus comprises: means for processing instructions including at least one core means; and security processing means for executing in a trusted execution environment, where the security processing means comprises a local attestation means for validating an enclave stored in a protected region of a system memory as a trusted agent, based at least in part on an identifier of the enclave stored in a whitelist.

In Example 25, the security processing means is to receive the whitelist from a remote server means during a secure session with the remote server means, the remote server means of a manufacturer of the security processor.

In Example 26, the whitelist comprises a plurality of entries, each entry to identify an enclave and to store a hash value of the enclave.

In Example 27, the security processing means for validating the enclave based at least in part on a comparison of a computed hash and a hash value stored in a corresponding entry of the whitelist, the computed hash value received in a digest from the enclave.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a client computing system comprising:
        a processor including one or more cores; and
        a security processor coupled to the processor, the security processor to execute in a trusted execution environment, wherein the security processor comprises a local attestation circuit to, within the client computing system, locally validate an enclave stored in a protected region of a system memory as a trusted agent, based at least in part on an identifier of the enclave stored in a whitelist comprising a list of approved trusted enclaves, the whitelist comprising a plurality of entries, each entry to identify an enclave and to store a hash value of an image of the enclave.

2. The system of claim 1, wherein the security processor is to receive the whitelist from a remote server during a secure session with the remote server, the remote server an authentication server of a manufacturer of the security processor.

3. The system of claim 1, wherein the security processor is to validate the enclave based at least in part on a comparison of a computed hash value and a hash value stored in a corresponding entry of the whitelist, the computed hash value received in a digest from the enclave.

4. The system of claim 1, wherein the protected region comprises:
    an enclave user mode region accessible to the processor; and
    a virtual address memory region accessible to the security processor.

5. The system of claim 4, wherein the virtual address memory region comprises a direct memory access (DMA) region, wherein the security processor is to write a security processor reporting instruction to the DMA region.

6. The system of claim 1, wherein the processor comprises an enclave mode circuit to interact with the enclave in an enclave mode.

7. The system of claim 6, wherein the processor comprises a security processor mode circuit to interact with the security processor in a security processor mode.

8. The system of claim 1, wherein the processor is to locally bind the enclave to the security processor.

9. The system of claim 8, wherein after the local binding of the enclave to the security processor, the security processor is to attest to a trusted state of the enclave to at least one remote requester.

10. The system of claim 1, wherein the system further comprises at least one of:
    a trusted time circuit, wherein the security processor is to enable the enclave to access the trusted time circuit after the enclave is validated as the trusted agent; and a monotonic counter, wherein the security processor is to enable the enclave to access the monotonic counter after the enclave is validated as the trusted agent.

11. At least one non-transitory computer readable storage medium comprising instructions that when executed enable a computing system to:

receive, in a central processing unit (CPU) of the computing system, an indication that a security processor of the computing system has written a reporting instruction to a protected region of an enclave address space of a system memory of the computing system;

identify that the security processor is in execution in a trusted execution environment; and in response to identifying that the security processor is in the execution in the trusted execution environment and that an enclave included in the system memory of the computing system and associated with the enclave address space is validly instantiated, comprising to generate a quote of the enclave after the enclave is instantiated and send the quote to the security processor, to enable the security processor to compare a hash value of the quote to a stored hash value, the stored hash value present in a whitelist stored in a trusted storage of the security processor that identifies trusted enclaves, locally bind the enclave and the security processor.

12. The at least one non-transitory computer readable storage medium of claim 11, further comprising instructions that when executed enable the computing system, in response to instantiation of the enclave, to set a first mode indicator to indicate that the enclave is validly instantiated in the trusted execution environment.

13. The at least one non-transitory computer readable storage medium of claim 12, further comprising instructions that when executed enable the computing system, in response to identifying that the security processor is in the execution in the trusted execution environment, to set a second mode indicator to indicate that the security processor is in valid execution in the trusted execution environment.

14. The at least one non-transitory computer readable storage medium of claim 13, further comprising instructions that when executed enable the computing system to locally bind the enclave and the security processor in response to the set first mode indicator and the set second mode indicator, and to thereafter attest, by the security processor, to a state of the enclave to at least one remote requester.

15. The at least one non-transitory computer readable storage medium of claim 11, wherein the whitelist is received from a remote authentication server associated with a manufacturer of the security processor.

16. An apparatus comprising:

a processor including one or more cores, at least one of the one or more cores including an enclave management circuit to manage an enclave, the enclave stored in an enclave virtual address region of a system memory, and a security processor management circuit to manage interaction with a security processor;

the security processor coupled to the processor, wherein the security processor comprises a local attestation circuit to, within the apparatus, locally validate the enclave in response to a comparison between a computed hash value of the enclave and a stored hash value, the stored hash value stored in a whitelist comprising a list of trusted approved enclaves, the whitelist comprising a plurality of entries, each entry to store a stored hash value of an image of an enclave; and the system memory coupled to the processor, the system memory including the enclave virtual address region to store the enclave, wherein the processor is to locally bind the enclave and the security processor.

17. The apparatus of claim 16, wherein the security processor is to receive the whitelist from a remote server during a secure session with the remote server, the remote server an authentication server of a manufacturer of the security processor.

18. The apparatus of claim 16, wherein the local attestation circuit is, in response to validation of the enclave, to directly send an attestation report to a remote requester to provide an attestation of a security state of the enclave, without interaction with a remote authentication server.

* * * * *